(12) United States Patent
Groene et al.

(10) Patent No.: US 12,429,188 B2
(45) Date of Patent: Sep. 30, 2025

(54) ILLUMINATION APPARATUS FOR A MOTOR VEHICLE

(71) Applicant: HELLA GmbH & Co. KGaA, Lippstadt (DE)

(72) Inventors: Stefan Groene, Brakel (DE); Carsten Hohmann, Warstein (DE); Martin Muegge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/665,152

(22) Filed: May 15, 2024

(65) Prior Publication Data

US 2024/0302017 A1 Sep. 12, 2024

Related U.S. Application Data

(63) Continuation of application No. PCT/EP2022/080229, filed on Oct. 28, 2022.

(30) Foreign Application Priority Data

Nov. 15, 2021 (DE) ...................... 10 2021 129 672.2

(51) Int. Cl.
*F21S 41/64* (2018.01)
*F21S 41/143* (2018.01)
(Continued)

(52) U.S. Cl.
CPC ........... *F21S 41/645* (2018.01); *F21S 41/143* (2018.01); *F21S 41/153* (2018.01); *F21S 41/265* (2018.01); *F21S 41/36* (2018.01)

(58) Field of Classification Search
CPC ........ F21S 41/265; F21S 41/645; F21S 41/36; F21S 41/143; F21S 41/153
See application file for complete search history.

(56) References Cited

U.S. PATENT DOCUMENTS 5,709,463 A * 1/1998 Igram ..................... F21V 29/67
349/67
7,312,927 B2 12/2007 Bogner et al.
(Continued)

FOREIGN PATENT DOCUMENTS

DE        10245933 A1     4/2004
DE    102013108811 A1 *  2/2015 .......... F21S 48/1136
(Continued)

OTHER PUBLICATIONS

International Search Report dated Feb. 28, 2023 in corresponding application PCT/EP2022/080229.

*Primary Examiner* — Zheng Song
(74) *Attorney, Agent, or Firm* — Muncy, Geissler, Olds & Lowe, P.C.

(57) ABSTRACT

An illumination apparatus for a motor vehicle, the illumination apparatus having a printed circuit board having a plurality of light-emitting diodes arranged thereon. An optical lens plate and a reflector element are provided with the reflector element being arranged between the printed circuit board and the optical lens plate. The reflector element has a plurality of segments into which the reflector element is divided, and each light-emitting diode is associated with a segment so that light emitted from the light-emitting diodes is reflected at the reflector element and passes through the optical lens plate.

13 Claims, 19 Drawing Sheets

(51) Int. Cl.
*F21S 41/153* (2018.01)
*F21S 41/265* (2018.01)
*F21S 41/36* (2018.01)

(56) References Cited

U.S. PATENT DOCUMENTS

| | | | | |
|---|---|---|---|---|
| 2006/0083002 | A1* | 4/2006 | Koike | F21S 41/151 |
| | | | | 362/800 |
| 2013/0107559 | A1* | 5/2013 | Gava | F21S 41/645 |
| | | | | 362/539 |
| 2019/0113821 | A1* | 4/2019 | Paolini, Jr. | G02F 1/134336 |
| 2019/0257493 | A1* | 8/2019 | Sugiyama | F21S 41/141 |
| 2020/0332977 | A1 | 10/2020 | Miedler et al. | |
| 2020/0400281 | A1* | 12/2020 | Nykerk | F21S 41/25 |

FOREIGN PATENT DOCUMENTS

| | | | | |
|---|---|---|---|---|
| DE | 102016119326 A1 | 4/2018 | | |
| DE | 102019213247 A1 | 3/2021 | | |
| JP | 2003276501 A * | 10/2003 | | |
| WO | WO-2004032235 A2 * | 4/2004 | | G02F 1/133603 |
| WO | WO-2020035313 A1 * | 2/2020 | | |
| WO | WO-2020260542 A1 * | 12/2020 | | F21S 41/645 |
| WO | WO2021084138 A1 | 5/2021 | | |
| WO | WO-2021224131 A1 * | 11/2021 | | F21V 13/02 |

\* cited by examiner

ILLUMINATION APPARATUS FOR A MOTOR VEHICLE

This nonprovisional application is a continuation of International Application No. PCT/EP2022/080229, which was filed on Oct. 28, 2022, and which claims priority to German Patent Application No. 10 2021 129 672.2, which was filed in Germany on Nov. 15, 2021, and which are both herein incorporated by reference.

BACKGROUND OF THE INVENTION

Field of the Invention

The present invention relates to an illumination apparatus for a motor vehicle, an illumination system and a motor vehicle.

Description of the Background Art

The design of a pixelated or segmented functional surface of a luminaire or illumination apparatus on a motor vehicle serves to define and provide a desired illumination signature by means of different, individual switching of individual segments/pixels or to display additional information content (e.g., numbers, text, pictograms). This means that new content or light signatures can be developed over the course of the vehicle's useful life and offered to the vehicle owner/driver without having to develop a new luminaire each time.

A corresponding illumination apparatus is known from DE 10 2016 119 326 A1, which is incorporated herein by reference.

From the general state of the art, LED displays with a matrix arrangement of RGB LEDs are known, which are mainly known from advertising or as video walls at trade fairs and concerts. The RGB LEDs are very low in luminous flux, which is why these LED displays cannot achieve the light intensity with the correspondingly limited number of LEDs legally required in the automotive sector. In addition, such LED displays are controlled via video interfaces, e.g., HDMI, which are not used in automobiles, as such video signals are not suitable for controlling luminaires and functions. Another disadvantage of these LED panels is the pixelated arrangement of light emitting diodes in a matrix. The viewer sees a bright spot at each LED point and only due to the very narrow distances and a correspondingly high resolution is a viewer able to see a sharp image even from close viewing distances. For this reason, light emitting diodes with distances of less than 2 mm are already provided or distances of 1 mm or less are desired in the LED panels.

In order to produce the legally required minimum light intensities of 4 cd for a red tail light, of 50 cd (EGE) or 130 cd (SAE) for a yellow direction indicator and of 60 cd (EGE) or 80 cd (SAE) for a red brake light, LEDs with higher operating currents and luminous fluxes, as well as an automotive specification, must be used in automotive applications, as well as optical systems that make optimal use of the luminous flux of the LED, so that even with a small number of pixels/segments, a brake light or a direction indicator can be generated and correspondingly, different light signatures can be developed and approved with the existing segmented matrix display area.

SUMMARY OF THE INVENTION

It is therefore an object of the present invention to specify an illumination apparatus improved over the state of the art, in particular one in which stray light from light emitting diodes does not adversely affect the appearance of light signatures of the illumination apparatus.

According to a first aspect of the invention, the above object is achieved by an illumination apparatus for a motor vehicle, wherein the illumination apparatus is set up in particular for light signature displays or for displaying light signatures. The illumination apparatus has a printed circuit board having a plurality of light emitting diodes arranged thereon, an optical lens plate and a reflector element. The reflector element is arranged between the printed circuit board and the optical lens plate. The reflector element has a plurality of segments into which the reflector element is divided, with each light emitting diode being associated with a segment so that light emitted from the light emitting diodes is reflected at the segments of the reflector element and passes through the optical lens plate. The illumination apparatus has a screen that is located on the optical lens plate and is set up for the selective switching of transparent and non-transparent areas. In particular, the selective circuit may be coordinated with a circuit of the light emitting diodes of the illumination apparatus, as will be explained in more detail below.

By controlling the screen it is possible that only light coming from a segment illuminated by a light emitting diode is let through the screen. For these segments, the area of the screen in front of them is switched to be transparent. On the other hand, stray light occurring in a segment that is not actively lit and originates from an actively lit segment through appropriate reflection, for example through the reflector element and the printed circuit board, can be prevented or blocked by controlling the screen accordingly. For this purpose, the other areas of the screen that are arranged in front of segments not actively or deliberately lit can be switched to be non-transparent.

In the present case, a screen can be understood to be an electrically controlled display for optical signaling of information. The terms monitor, screen or display can also be used synonymously for the screen.

The illumination apparatus being designed for a motor vehicle means, for example, that the illumination apparatus is suitable for use in a motor vehicle. It is conceivable and possible to use the inventive illumination apparatus in other areas of application. However, the motor vehicle is the particularly preferred area of application. Thus, the illumination apparatus can be a motor vehicle illumination apparatus in particular. For example, the illumination apparatus may be a rear light, an auxiliary light, a headlight or the like.

In particular, the screen may be designed to transmit light from active segments illuminated by the light emitting diodes associated with them by switching the area of the screen in front of these active segments to be transparent, and to block light from non-active segments that are not illuminated by the light emitting diodes associated with them by switching the area of the screen in front of these non-active segments to be non-transparent. This can be done by simultaneous and coordinated switching of the printed circuit board or light emitting diodes and the screen, for which these two can be set up accordingly, for example by means of a control unit of one of the two, which performs this task. In this way, the visibility of the unwanted stray light in the unlit or non-active segments can be prevented. The contrast ratio for the display of different light signatures can also be improved.

In particular, the screen can be an LC display, i.e., a liquid crystal display (LCD). The display can be a very flat element made of two thin glass panes or plastic films with a liquid crystal in between. For example, the LC display can be an active LCD, especially with a high resolution.

The LC display can also be a passive LC display, also known as a guest host display or smart glass display. The advantage of the passive LC display is an arbitrary pixelation of the display, i.e., the separately switchable pixels can be given an arbitrary, different shape and size and thus actively provide the desired design of the segments of the reflector element and define or optimize it for the lighting function. For example, triangular, diamond-shaped, square or any other shaped pixels can be specified and implemented, or special graphic elements such as letters, pictograms or logos for the light signature to be displayed. In contrast to active LCDs with very low pixelation for high resolutions, the passive displays and especially automotive applications opt for larger pixel areas or segments. In addition, since rather small areas are used for automotive lighting functions, from which a high light output (brightness) must be realized in order to generate the legally required light levels of a signal function, a high degree of transmission of the screen is important. Since an active LCD works with polarized light, there are generally high light losses due to corresponding polarizing filters, while the passive LCD display does not require polarizing filters and thus, a higher degree of transmission is available, which is advantageous and decisive for fulfilling a light function with a small light element.

In particular, the screen can be a dye-doped display. In particular, color pigments of the dye-doped display can be black color pigments. However, color pigments of any other color are also possible. For example, the passive LC displays are so-called dye-doped displays. These are doped with color pigments that determine the color of the display when it is not in use. Thus, a black surface may be visible when using black color pigments. Alternatively, of course, a red or blue color or a surface in another desired color is also possible, depending on the choice of color pigments. In a black color version, it is advantageous that a black surface is visible when the screen is switched off, which causes a black panel effect, which is then transferred to the lighting technology in motor vehicles, i.e., headlights and rear lights, for example.

Since rather small areas are used for automotive lighting functions, from which a high light output (brightness) must be realized in order to generate the legally required light intensities of a signal function, a high transmittance of the display is important. Since an active LCD works with polarized light, there are generally high light losses due to corresponding polarizing filters, while the passive LCD display does not require polarizing filters and thus a higher transmittance is available, which is advantageous and decisive for fulfilling a light function with a small lighting element.

The combination of the segment and screen area, which can be actively switched on and off by switching the respective light emitting diodes, ensures the best possible contrast and optimum recognizability of the light signatures generated on the illumination apparatus. In the non-operating state, as described, a stylistically desired dark, black area can also be provided. Dimmability of the screen can also be provided, which can be provided for by appropriate control equipment in the illumination apparatus. By dimming the display areas, a fine gradation of brightness can be carried out in addition to, and superimposed to, the dimming of the light emitting diodes, so that differentiated differences in brightness can also be generated within a light signature.

It may also be provided that each light emitting diode is associated with a segment in such a way that light emitted from each light emitting diode is reflected at the reflector element (or respective segment of the reflector element) and passes through the optical lens plate in the area of the segment associated with this light emitting diode. In particular, a contrast increase can be achieved by partially switching the LEDs on or off in combination with the display circuitry. The assignment of the segments to the light emitting diodes can be done by corresponding relative arrangement to each other. For example, each segment of a reflector element can surround a light emitting diode on the printed circuit board, in particular enveloping or enclosing it. This causes the light of the respective light emitting diode to reflect at the reflector element in the area of the respective segment.

In particular, the segments can have a triangular, rectangular, pentagonal or hexagonal or other polygonal shape. The shape refers in particular to the cross-section of the segment or the shape is visible in the top view of the segment at the reflector element. Accordingly, areas on the optical lens plate can be illuminated that take on a corresponding shape of the segments, i.e., a triangular light shape, a rectangular light shape, a pentagonal light shape or a hexagonal light shape. This allows for different light signatures to be displayed by illuminating multiple segments by means of the illumination apparatus. Especially in the case of triangular segments, a particularly high degree of freedom of control for different light signatures is possible. It has been shown that the design of the reflector element with, for example, the triangular segments shows an advantageous arrangement in the illumination apparatus, which allows for a very precise display of different light signatures using a comparatively small number of segments.

The shape refers in particular to the cross-section of the segment or the shape is visible in the top view of the segment at the reflector element. Accordingly, areas on the optical lens plate can be illuminated that take on a corresponding shape of the segments, i.e., a triangular light shape, for example. As a result, many different light signatures, especially those relevant for traffic and other things, can be displayed by illuminating the correspondingly shaped segments by means of the illumination apparatus. In the case of the triangular segments, a particularly high degree of freedom of control for different light signatures is possible.

In a triangular segment, for example, each segment has three reflector surfaces or reflector walls that are connected to each other on their sides. In the middle, the segments can each have two openings. An opening is close to the light emitting diode associated with the segment in order to let the light from the light emitting diode shine in. The other opening is close to the optical lens plate or away from the light emitting diode in order to let the light reflected at the reflector surfaces of the segments of the reflector element shine onto the optical lens plate. In particular, the opening close to the light emitting diode is smaller than the opening close to the optical lens plate. Accordingly, tapered or converging segments can be provided, especially in the direction of the optical lens plate to the light emitting diodes. The segments can therefore also be described as funnel-shaped or pyramid-shaped with corresponding openings at the top and bottom of the pyramid shape in terms of their body or volume.

Several segments can be combined to form a row- and column-by-column arrangement at the reflector element. The repetitive arrangements of the segments with their respective shapes allow for a particularly versatile design and display of different light signatures. For example, the arrangements can each have a rectangular shape or honeycomb shape. In particular, the arrangements can be rectangular, especially square, with a triangular shape of the segments, and honeycomb with a hexagonal shape of the segments.

In particular, the arrangements may have a rectangular shape, especially a square shape. Four triangular segments can be combined into a rectangular shape. Accordingly, the light emitting diodes on the printed circuit board can also be arranged accordingly. For example, the printed circuit board can have a repeating pattern of an arrangement of four light emitting diodes each. For example, the arrangement can be described as a plus or + arrangement, in which four light emitting diodes can be connected to each other by two imaginary lines, each of which connects and intersects two light emitting diodes horizontally and vertically.

Each segment can be associated with a concave lens, which can be arranged in each case between the reflector element and the optical lens plate. In particular, the lenses can be arranged, in particular molded, on the optical lens plate, in particular on the inner side of the optical lens plate or the side opposite the reflector element. In particular, the assignment means that one lens is arranged opposite each segment. In particular, the lenses can be formed in one piece with the optical lens plate. It is also possible that the lenses have a triangular or essentially triangular shape in order to correspond to the segments. On the one hand, a concave, central surface of the lenses can be at a greater distance (several millimeters) from the respective light emitting diode associated with it by means of the segment. In contrast, due to their design, especially as pyramidal optics, the lenses can have a larger wall thickness in their exterior. This is advantageous for a uniform illumination without an emphasis on axial light emitting diode intensity (especially with so-called TOP-LEDs), allowing for illumination of the segment or the area of the optical lens plate in front of the segment without hotspots. At the same time, the optical lens plate also contains a light guide effect and, in the interaction of the prism surfaces of the lens and the surrounding reflector surfaces of the segments of the reflector element, also an additional light guide, which, together with the central illumination of the concave lens surface leads to a homogeneous illumination of the segment or the area of the optical lens plate in front of the segment, thus providing high performance.

It is possible, additionally or alternatively, to use radially emitting light emitting diodes. Despite the radial emission of the light emitted by the light emitting diodes, the reflector element deflects the light emitted by the radial-beam light emitting diodes in the forward direction, i.e., onto the optical lens plate. Accordingly, the reflector element can be specially designed to deflect the radial light emitted by each of the light emitting diodes in the forward direction towards the optical lens plate. As a result, a particularly uniform illumination of each area of a segment or of the optical lens plate in the area of the segments can be achieved, so that a uniform illumination of the optical lens plate or the segments is achieved. The advantage of the light emitting diodes of the radial-beam type used is that the path of the light to the reflector element or the wall elements there is comparatively short. As a result, it is possible to provide a comparatively compact illumination apparatus for a motor vehicle. In particular, the illumination apparatus can be designed with a comparatively low thickness, especially when measured from the printed circuit board to the optical lens plate. In particular, radial-beam light emitting diodes may be designed to radiate light radially at or from their circumference. At least not only or not predominantly, light can also be emitted from the front of each of the light emitting diodes, as is the case with a TOP-LED, for example. However, it is crucial that light is also (in particular mostly) emitted radially or ring-shaped from the circumference of the light emitting diodes. The circumference of a light emitting diode is understood to mean the sides of the light emitting diode, which typically extend obliquely to the front, especially orthogonally. In other words, the circumference with its side or sides is between the front and back of the light emitting diode. In particular, radial light emitting diodes may be designed to radiate light radially outwards over at least half of their circumference or substantially along their entire circumference. In other words, light may be emitted radially outwards along at least half, predominantly, or substantially all of the circumference, or, in other words, it may be emitted in a ring from each of the light emitting diodes.

The design of the optical lens plate with the concave lenses and/or the choice of radial-beam light emitting diodes in combination with the light emitting diode light distribution and the reflector element leads to a uniform illumination of the segments or segment surfaces of the reflector element and thus of the optical lens plate. This provides a segment display function and at the same time a high photometric performance, as almost all of the light from the respective light emitting diodes is used. This way, the illumination apparatus is already able to provide high intensities even with relatively weak light emitting diodes and implement functions such as tail light, brake light, direction indicator or daytime running lights, especially when several illumination apparatuses are used as part of an illumination system to switch a continuous or common light signature.

It is also possible that the segments have strip optics or that strip optics are formed in the segments. A strip optic can be provided on each surface or reflector wall of the segment or reflector element. The strip optics, which can also be referred to as ripple optics, can scatter the direct surface reflection of the light emitting diode light and thus counteract a concentrated image of the light in the illumination in order to avoid hotspots.

In addition, it may be provided that a distance between the light emitting diodes and the optical lens plate is less than 15 mm, preferably less than 12 mm, further preferably less than 10 mm and particularly preferably less than 8 mm. For example, the lower limit of the distance can be at least 2 mm, especially at least 4 mm and further particularly at least 6 mm. Accordingly, a particularly compact illumination apparatus is provided, which has a particularly low thickness.

In addition, the illumination apparatus may have a grating mask (with a grating or with grating struts) that (visually) demarcate the segments from each other. In particular, the grating mask is opaque (in the area of its grating or grating struts). For example, the grating mask can be black. Accordingly, the grating struts or the grating of the grating mask ensure that the segments are separated from each other in the cold and warm appearance of the illumination apparatus in order to improve the visual perception of the displayable light signatures.

In particular, the grating mask can be designed as a sheet metal, a foil, an injection molding part and/or a laser ablation of the optical lens plate. In particular, a thin sheet can be used as a sheet metal, for example with a wall thickness between 0.1 mm and 0.5 mm, which can be lasered for the creation of openings in the area of the segments. The sheet metal can then be clamped between the optical lens plate and a housing frame or housing of the illumination apparatus in the assembly or glued onto the optical lens plate or into the housing frame. The foil can be printed or glued, for example. The foil or adhesive foil can be printed with the grating or grating struts and glued to the optical lens plate or clamped between the optical lens plate and the housing frame in the assembly. In particular, a 2-component molded part can be used as an injection-molded part. For example, the grating mask can be injected onto the optical lens plate as a second, black component. In the case of laser ablation, for example, the optical lens plate can be metallized or painted and then laser-cut for the open segment surfaces.

The illumination apparatus may also have a housing, in particular embodied as a housing frame or with a housing frame. The housing can contain the printed circuit board, the reflector element and the optical lens plate and the screen. Furthermore, the grating mask can also be included in the housing. Fastening elements, such as screw bosses, can be arranged at the back of the housing.

In addition, it may be provided that the optical lens plate has optical scattering elements on its front and/or back. For example, pillow optics or micro-optics can be provided as optical scattering elements, or a diffractive diffuser structure or microstructure or, in the simplest case, an EDM structure or etching structure.

According to a second aspect of the invention, the object mentioned above is achieved by an illumination system for a motor vehicle having an illumination apparatus according to the first aspect of the invention and a control unit for controlling a light signature display of the illumination apparatus.

In particular, the illumination apparatus can be variably controlled via the control unit or the electronics in order to display a wide variety of contents, such as individual pictograms and signs, such as traffic signs, or traffic aid signs, such as a right-pointing arrow, an indicator arrow, an image of a pedestrian or the like. Such content, which can be represented by means of appropriate illumination by several of the light emitting diodes or segments, are understood herein as light signatures. Such light signatures can be static or dynamic, i.e., they do not change over time or they do change over time.

In particular, the illumination system may have several illumination apparatuses according to the first aspect of the invention. The control unit can be set up to control at least two of the several illumination apparatuses to display a common light signature.

In the present case, a common light signature is understood to mean that the light signature of at least two illumination apparatuses are matched to each other in order to represent the same or a coordinated content by means of the lighting.

According to a third aspect of the invention, the object mentioned above is achieved by a motor vehicle having an illumination apparatus according to the first aspect of the invention or an illumination system according to the second aspect of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
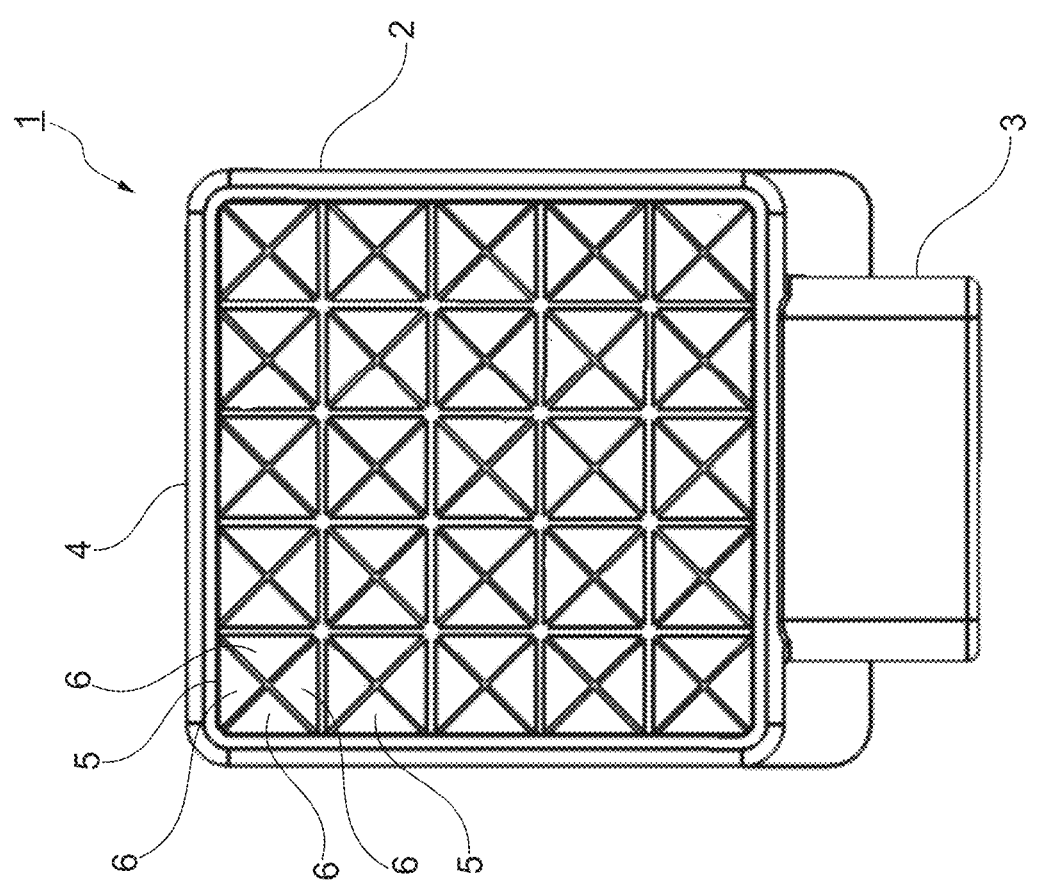
FIG. 1 shows a plan view of an illumination apparatus according to an example of the invention.
Figure 2:
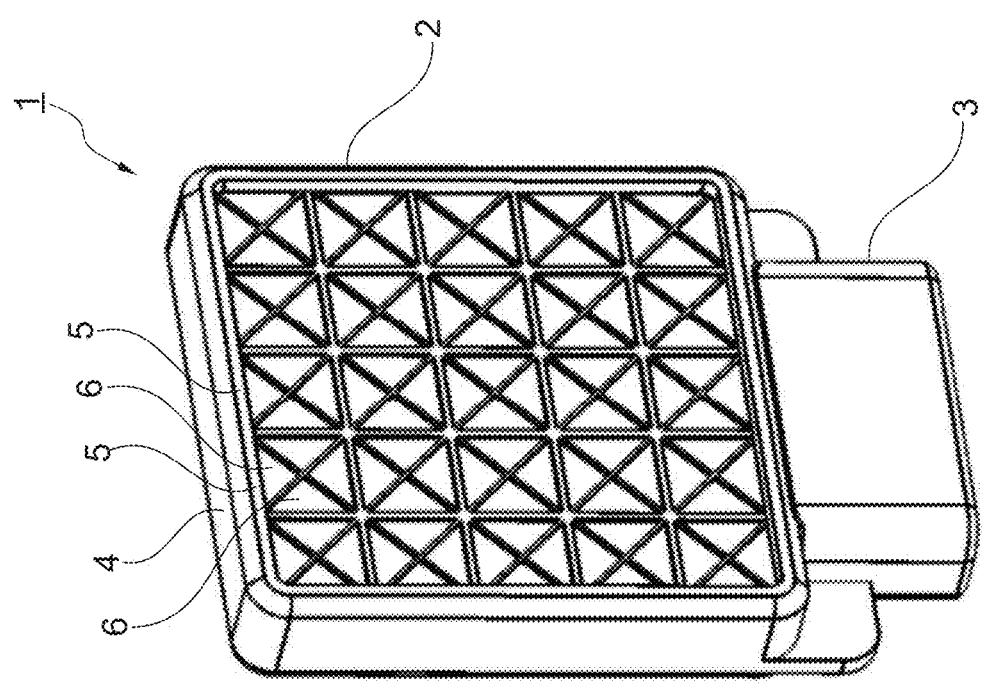
FIG. 2 shows an oblique view of the illumination apparatus from FIG. 1.
Figure 3:
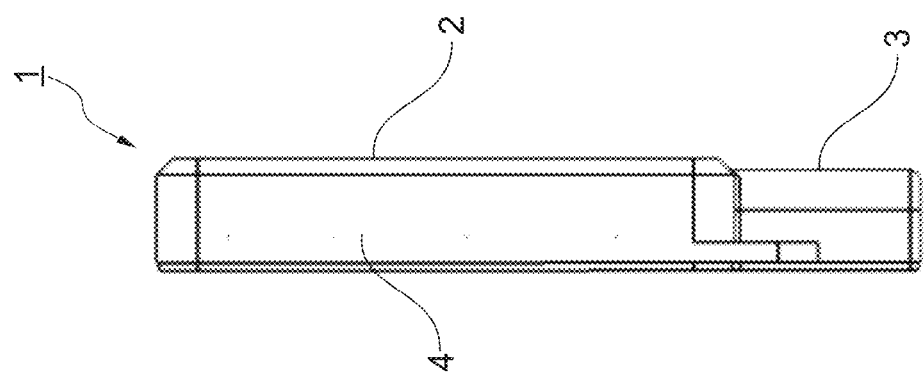
FIG. 3 shows a side view of the illumination apparatus from FIG. 1.

FIGS. 1 to 3 each show an illumination apparatus 1 according to an example of the invention in a plan view, a perspective view and a side view.

The illumination apparatus 1 comprises a housing 4, which in the present case is designed as a housing frame with an upper part 2 and a lower part 3. The housing 4 has a thickness that is small as compared to its width and height extension. In the present case, especially in the upper part 2, the housing 4 is in particular rectangular, in particular square, so that the illumination apparatus 1 has a rectangular shape as a whole. Alternatively, the housing 4 or the illumination apparatus 1 may have other shapes, such as rectangular, round, or oval.

As can be seen in FIG. 1, the illumination apparatus 1 has several arrangements 5, each comprising a plurality of segments 6. In the present case, the arrangements 5 are square in their basic shape or appearance on the optical lens plate 8 (see FIG. 5) of the illumination apparatus 1 and comprise four triangular segments 6 each. The individual segments 6 can be individually and uniformly illuminated by means of light emitting diodes 11 (see FIG. 5) arranged behind them.

Figure 4:
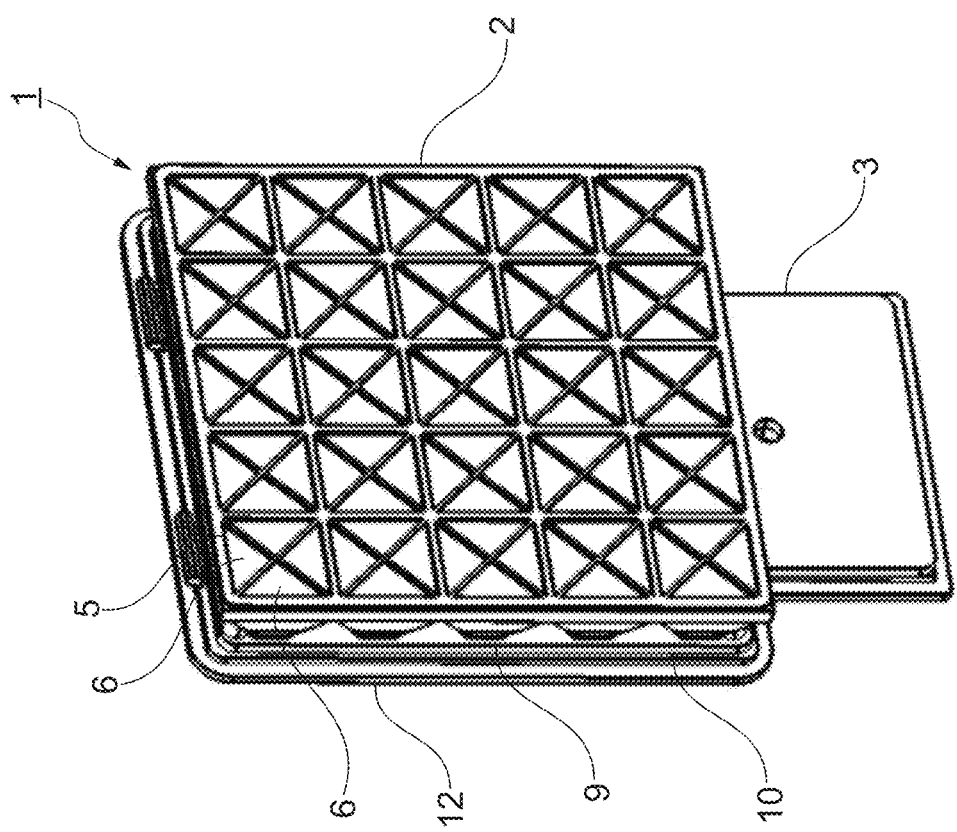
FIG. 4 shows an oblique view of the illumination apparatus from FIG. 1 without a housing.

FIG. 4 shows in a perspective view of the illumination apparatus 1 without housing 4 that for this purpose the light emitting diodes 11 (see FIG. 5) are arranged on a printed circuit board 10 or plate and behind a reflector element 9. Behind the printed circuit board 10, a rear part 12 of the housing 4 can also be seen, which allows for the housing 4 to be closed from the back.

Figure 5:
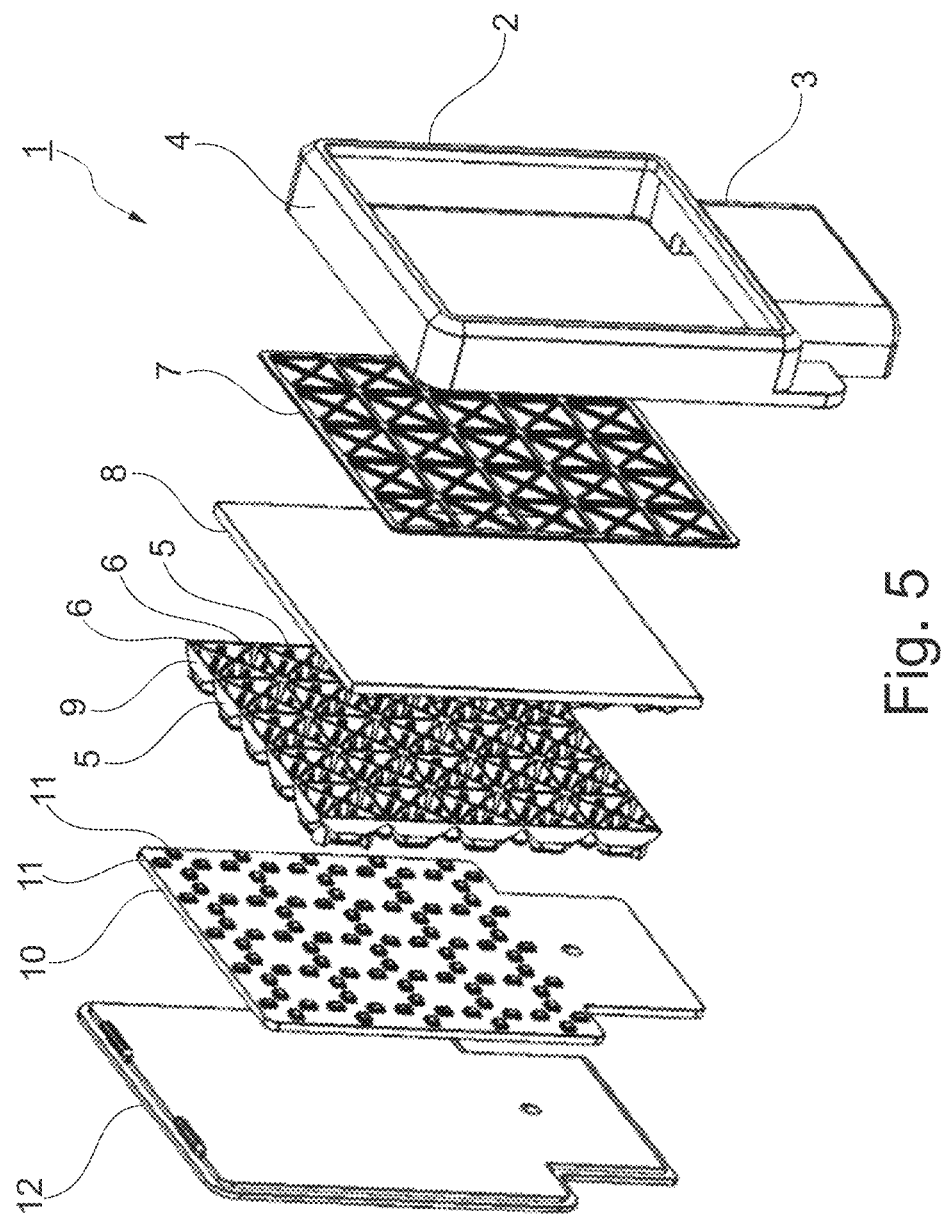
FIG. 5 shows an exploded view of the illumination apparatus from FIG. 1.

FIG. 5 shows an exploded view of the illumination apparatus 1, from which it can be seen that the reflector element 9 has the segments 6 arranged in arrangements 5 and the repeating arrangements 5. In the present case, the reflector element 9 is arranged in a single piece with all arrangements 5 and segments 6. Alternatively, the segments 6 can also be manufactured individually, but this is more complex.

The reflector element 9 is arranged on the printed circuit board 10 with the light emitting diodes 11. Here, one light emitting diode 11 is associated with one segment 6 each in the reflector element 9 or one segment 6 surrounds one of the light emitting diodes 11 each on the printed circuit board 10.

On the reflector element 9, an optical pane 8, for example made of glass or plastic, is arranged. On the optical lens plate 8, on the other hand, there is a grating mask 7, which provides an optical separation of the segments 6 from each other. All of the above-mentioned components are included in the housing 4.

Figure 6:
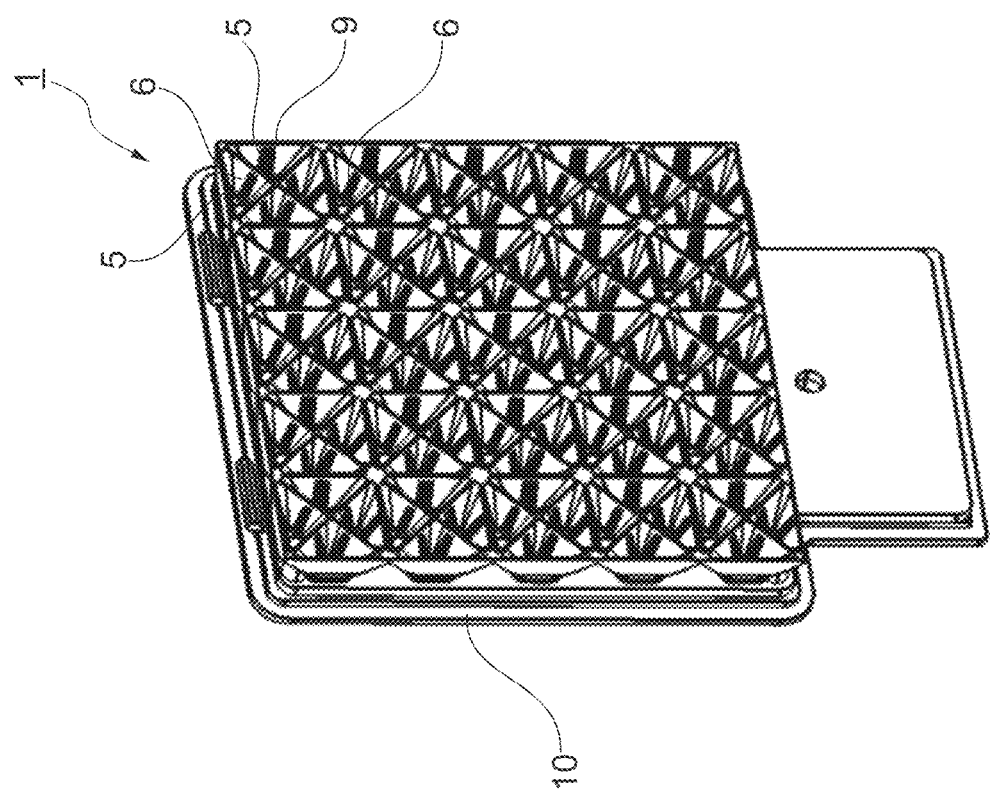
FIG. 6 shows an oblique view of the illumination apparatus from FIG. 1 without a housing and without a grating mask.

FIG. 6 shows an oblique view of the illumination apparatus 1 without housing 4, without optical lens plate 8 and without grating mask 7. Here you can see how one light emitting diode 11 (not directly visible) is arranged within each segment 6 or how it is surrounded by the segment 6, which can illuminate the light emitting diode 11.

Figure 7:
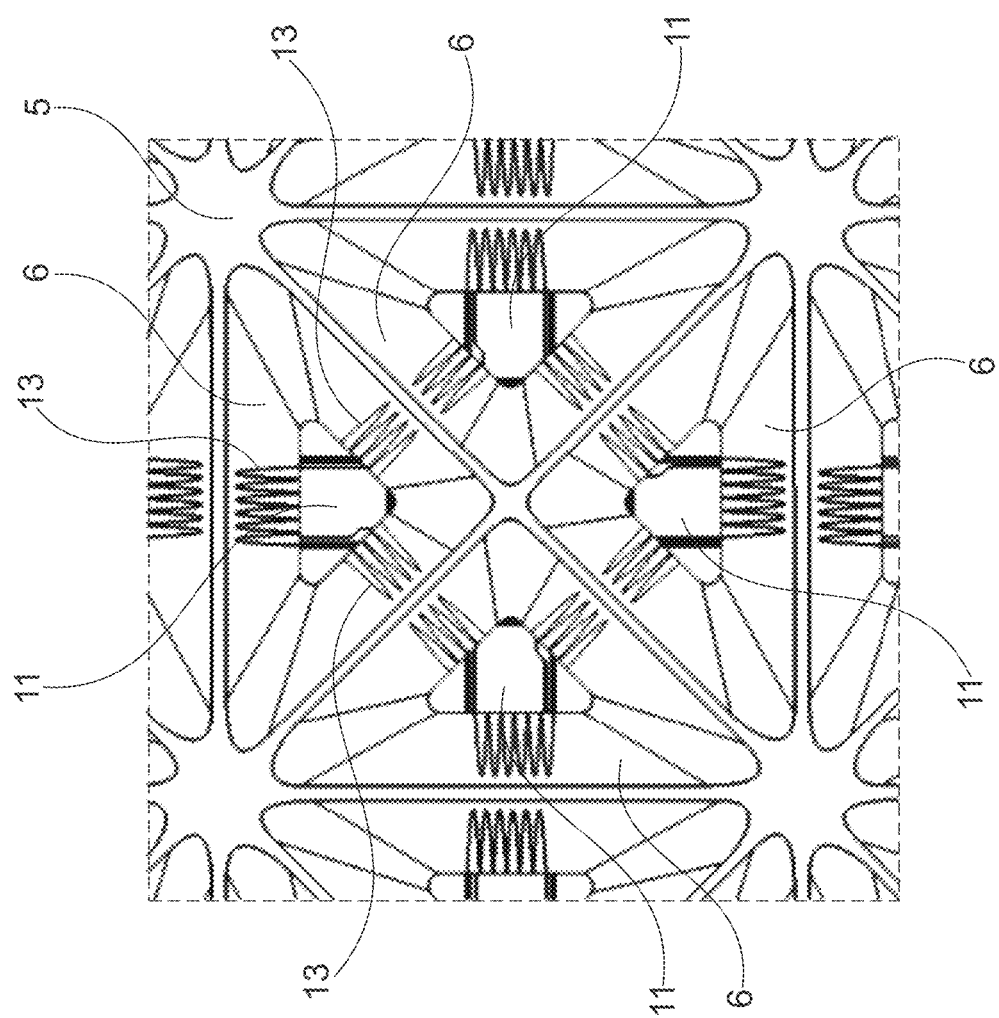
FIG. 7 shows a detailed view of an arrangement of the illumination apparatus from FIG. 1.

FIG. 7 shows a detailed view of an arrangement 5 with four triangular segments 6 arranged in the square arrangement 5 on the printed circuit board 10. Each of the segments 6 has three reflector surfaces or walls at angles to each other, on each of which a strip optics 13 is formed in close proximity to the light emitting diode 11 associated with the respective segment 6. The corners of the segment 6 are rounded. The segments 6 extend from the respective light emitting diode 11 in the direction of the optical lens plate 8 with an opening close to the light emitting diode 11, which allows for the irradiation of light from the light emitting diode 11 to the reflector surfaces, to a larger opening, from which the light then emerges onto the optical lens plate 8, through which it then passes in turn.

Figure 8:
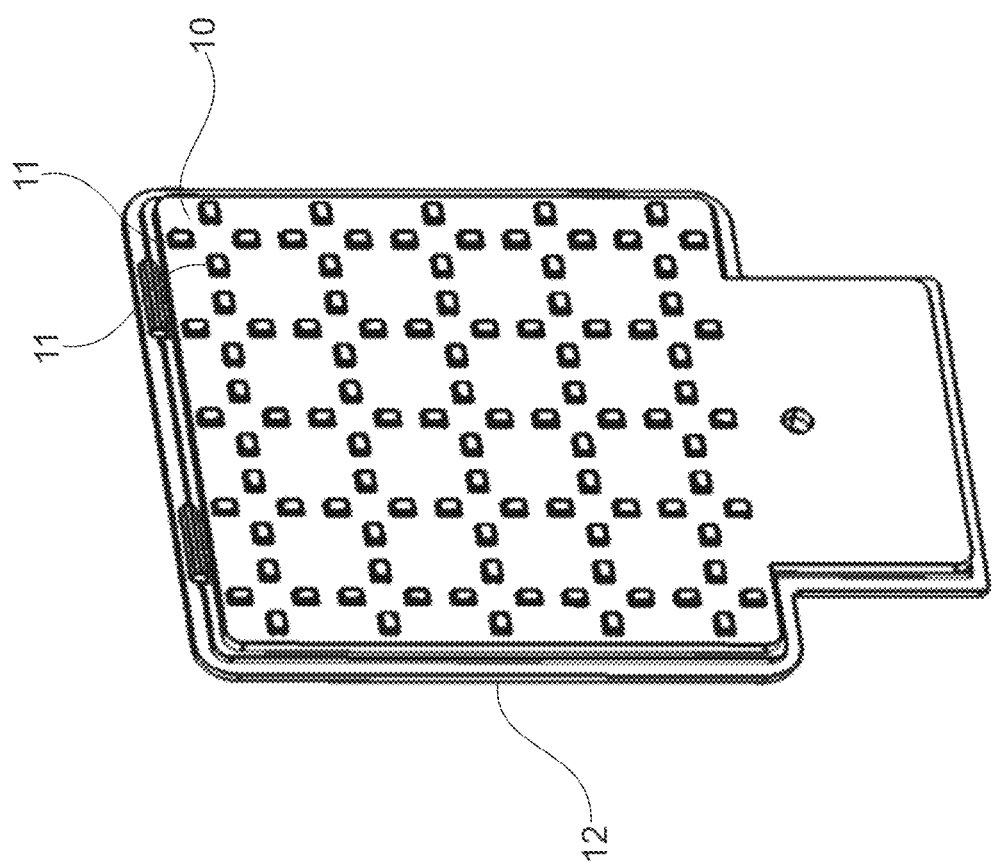
FIG. 8 shows an oblique view of the printed circuit board of the illumination apparatus from FIG. 1.

FIG. 8 shows an oblique view of the printed circuit board 10 with the light emitting diodes 11. As can be seen, the light emitting diodes 11 are arranged here in a repeating plus arrangement corresponding to the arrangements 5 on the printed circuit board 10.

Figure 9:
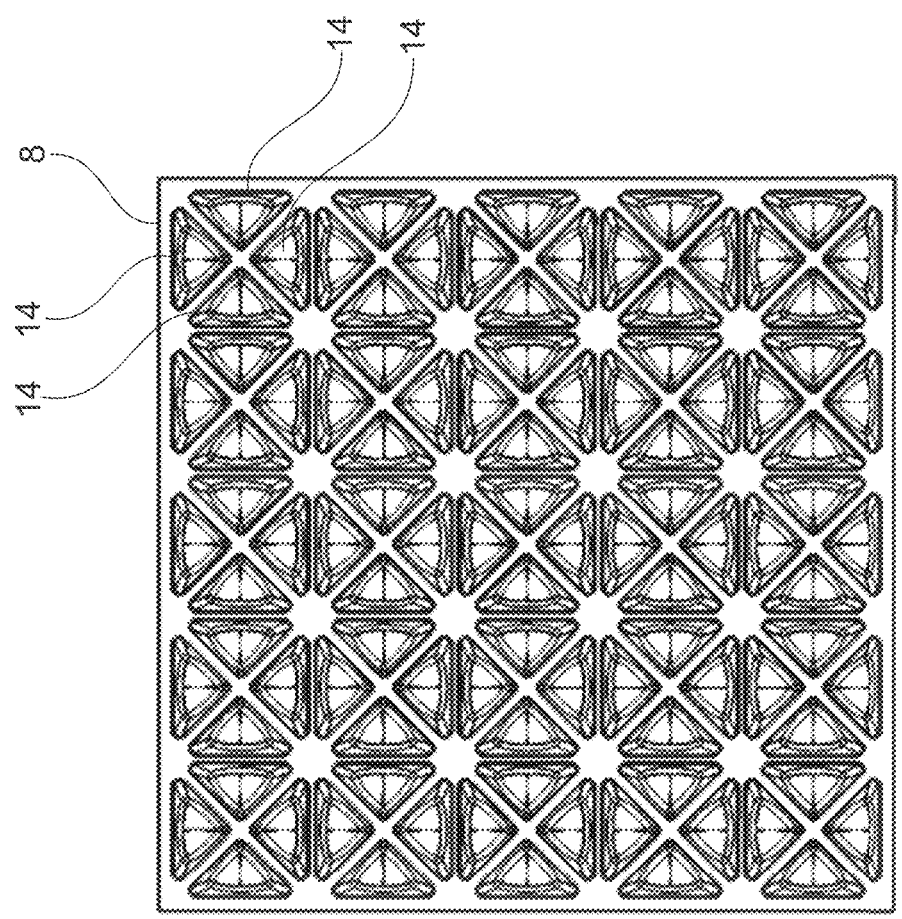
FIG. 9 shows a plan view of the back of the optical lens plate of the illumination apparatus from FIG. 1.

FIG. 9 shows a plan view of the back of the optical lens plate 8 of the illumination apparatus 1, i.e., the side facing the reflector element 9. Here it can be seen that the optical lens plate 8 is formed on its back with a plurality of concave lenses 14, each of which is triangular in shape and is arranged on the optical lens plate 8 in accordance with the arrangement 5 of the segments 6 so that in each case one lens 14 is associated with or is opposite a segment 6.

Figure 10:
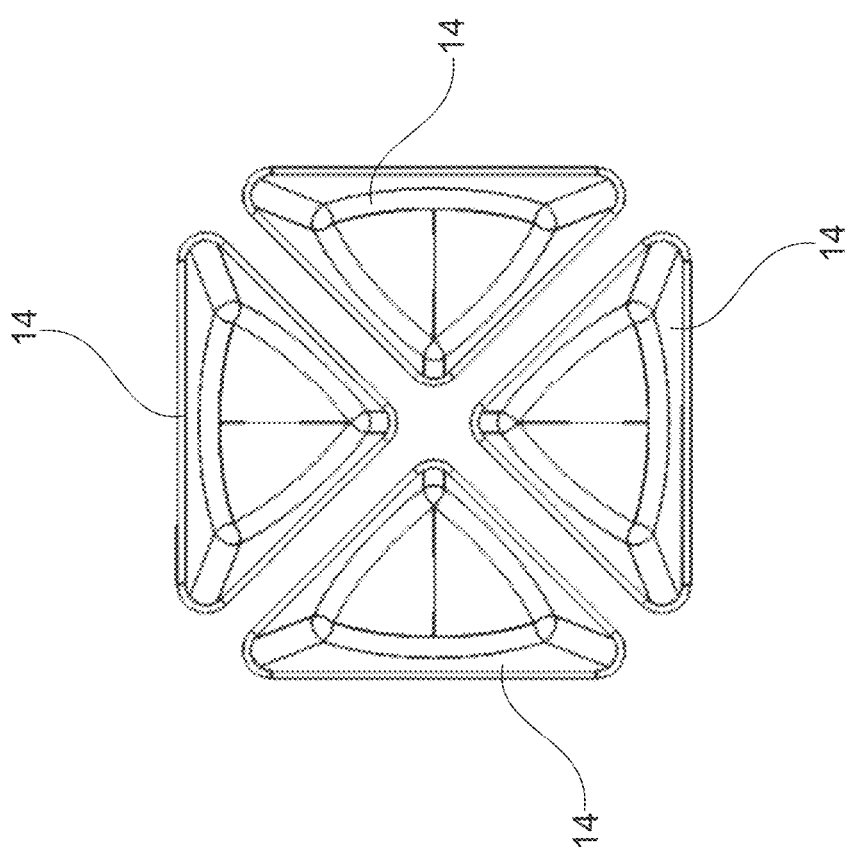
FIG. 10 shows a plan view of an arrangement of concave lenses of the optical lens plate from FIG. 9.
Figure 11:
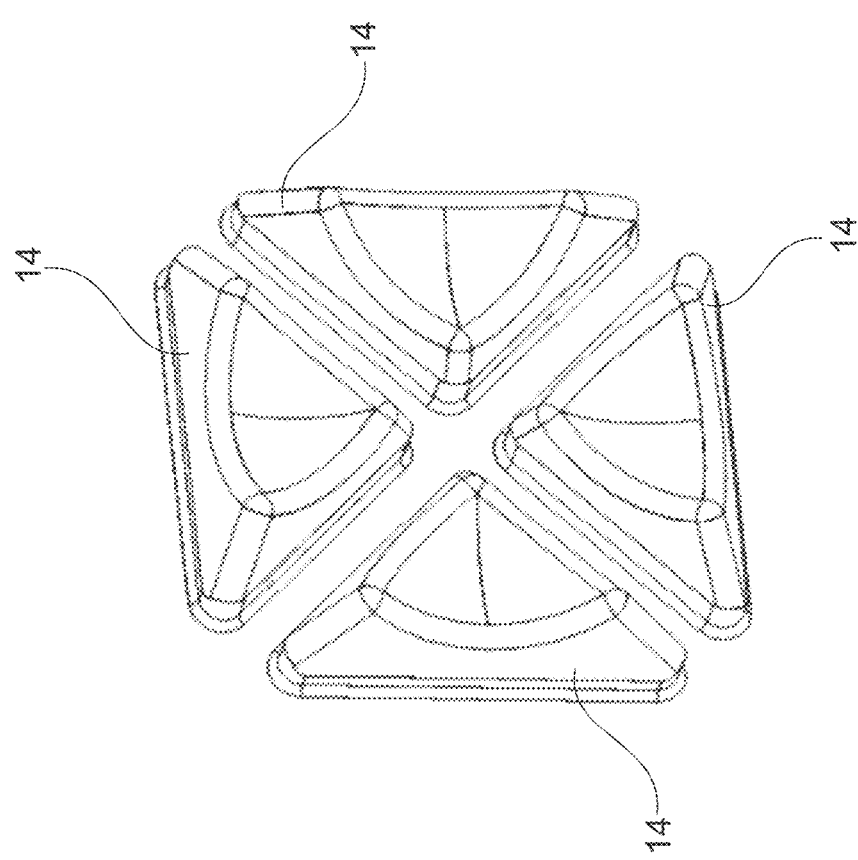
FIG. 11 shows an oblique view of the arrangement of the concave lenses from FIG. 10.
Figure 12:
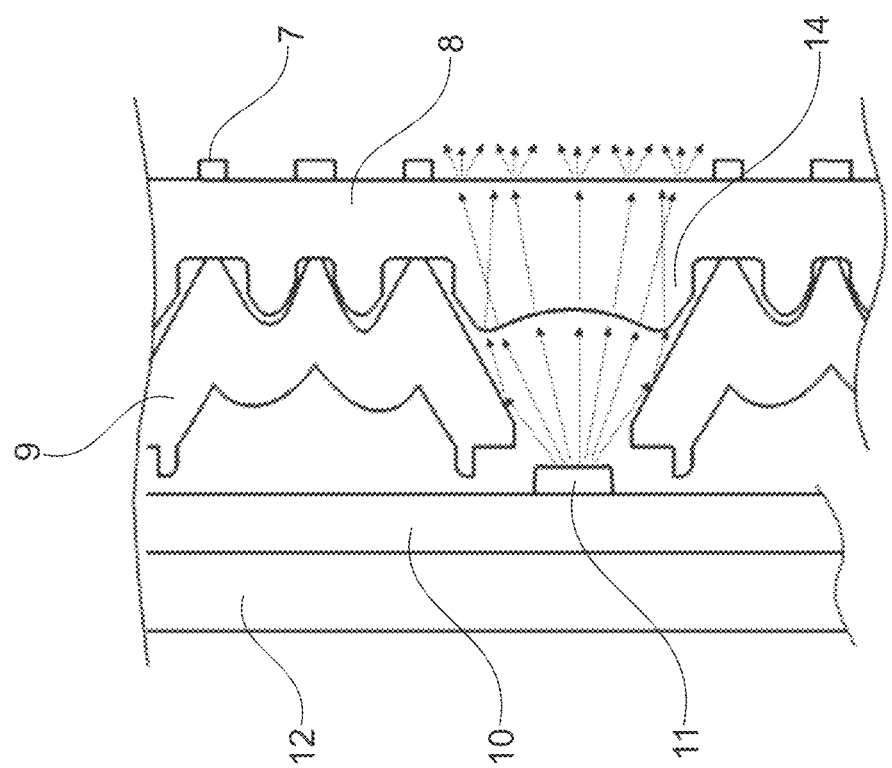
FIG. 12 shows a schematic view of a section of the illumination apparatus from FIG. 1 in operation.

FIGS. 10 and 11 show the concave lenses 14 in a plan view and an oblique view in an arrangement with four concave lenses 14. Here it is particularly easy to see that the lenses 14 each have a concave, central surface, which accordingly have a greater distance to the light emitting diode 11 in each case associated with it by means of the segment 6. Their shape corresponds to a pyramidal optics, so that the lenses have a larger wall thickness in their outer range. This is advantageous for a uniform illumination without emphasis on axial light emitting diode intensity (especially with so-called TOP-LEDs) and thus enables the illumination of the segment 6 or the area of the optical lens plate 8 in front of the segment 6 without hotspots.

FIG. 9 shows a section of the illumination apparatus 1 in a cross-sectional view. As an example, a section of a printed circuit board 10 with three light emitting diodes 11 as well as wall elements or reflector surfaces of the segments 6 of the reflector element 9 can be seen here. Finally, the grating mask 7 is located behind the optical lens plate 8.

The distance between the light emitting diodes 11 and the optical lens plate 8 is particularly small, for example only 10 cm or less, in order to achieve the compactness or low thickness of the illumination apparatus 1 mentioned above. Accordingly, there is little space for the corresponding reflector element 9 or corresponding reflections. At the same time, however, it is necessary to ensure that the illumination of the respective segment 6 or the area of the optical lens plate 8 in front of the respective segment 6 is as uniform as possible.

In order to ensure this, as already explained, the concave lenses 14, which are molded in one piece with the optical lens plate 8 as an example, are used in the present case. The lenses 14 also contain a light guide effect and, in the interaction of the prism surfaces of the lenses 14 and the surrounding reflector surfaces of the segments 6, also provide additional light guidance, which, together with the central illumination of the concave lens surface, leads to a homogeneous illumination of the segment 6.

Figure 13:
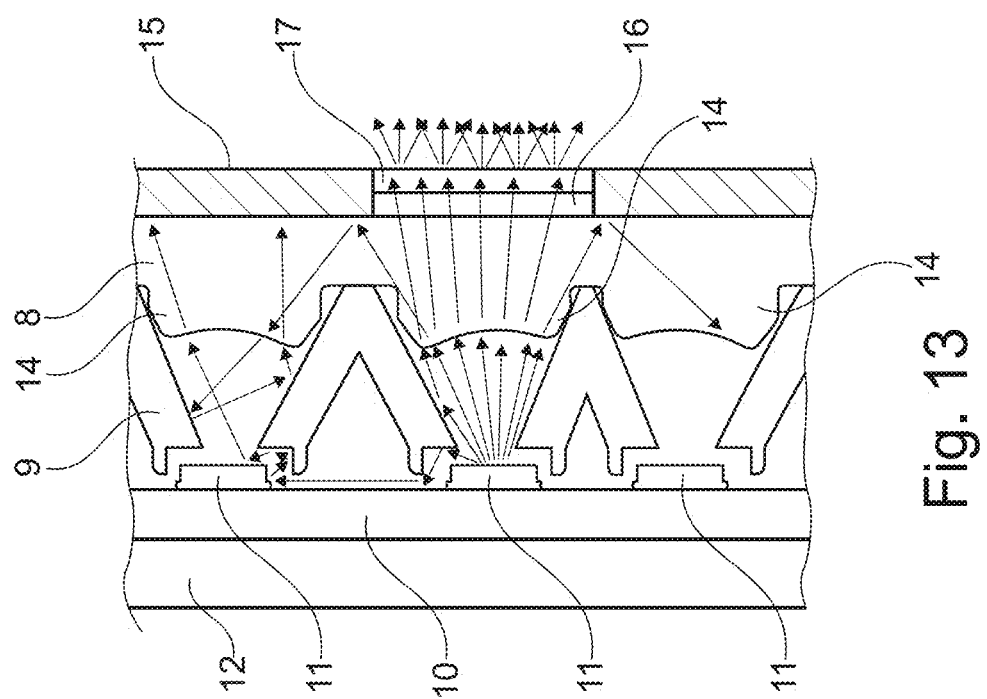
FIG. 13 shows the view from FIG. 12 with a solution to avoid stray light in unlit segments.

Now, as FIG. 13 shows in another view, there may be a deflection of light from one segment 6 to another segment 6 between the light emitting diodes 11 and the reflector element 9 or the segments 6. This can also be referred to as stray light. The problem with this stray light is that segments 6 not actively illuminated by a light emitting diode 11 associated with a segment 6 are nevertheless illuminated to a small degree. This impairs the desired light signature display of the illumination apparatus 1.

In order to solve this problem, a screen 15, in particular a passive LC display, is arranged on the front or visible side of the optical lens plate 8, which in the present case is formed by way of example from a first thin substrate 16 and a second thin substrate 17 and a liquid crystal in between. The substrates 16 and 17 can be, for example, glass panes or plastic films.

Now, the screen 15 is especially a so-called dye-doped display, in which the color pigments of the screen 15 are doped. When the screen 15 is not in use, the color pigments, which can be black, for example, determine the color of the screen 15.

The screen 15 is now programmed or set up in terms of control technology with the light emitting diodes 11 or the printed circuit board 10 in such a way that the screen 15 is switched off or does not remain transparent in the area of those segments 6 or opposite segments 6 to which assigned light emitting diodes 11 are not activated, so that only the predetermined color pigments can be seen, i.e., black, for example. As a result, no stray light can be seen from outside in the non-active segments 6, even if it hits the optical lens plate 8 there.

Again, the screen 15 is programmed or set up in terms of control technology to switch on in relation to those segment 6, which are illuminated by switching on the light emitting diodes 11, in order to switch the screen 15 to be transparent in this area in relation to the segment 6, as can be seen in FIG. 13. As a result, the light from the light emitting diode 11 of this segment 6 can escape from the optical lens plate 8 or the illumination apparatus 1 and be perceived visually.

Figure 14:
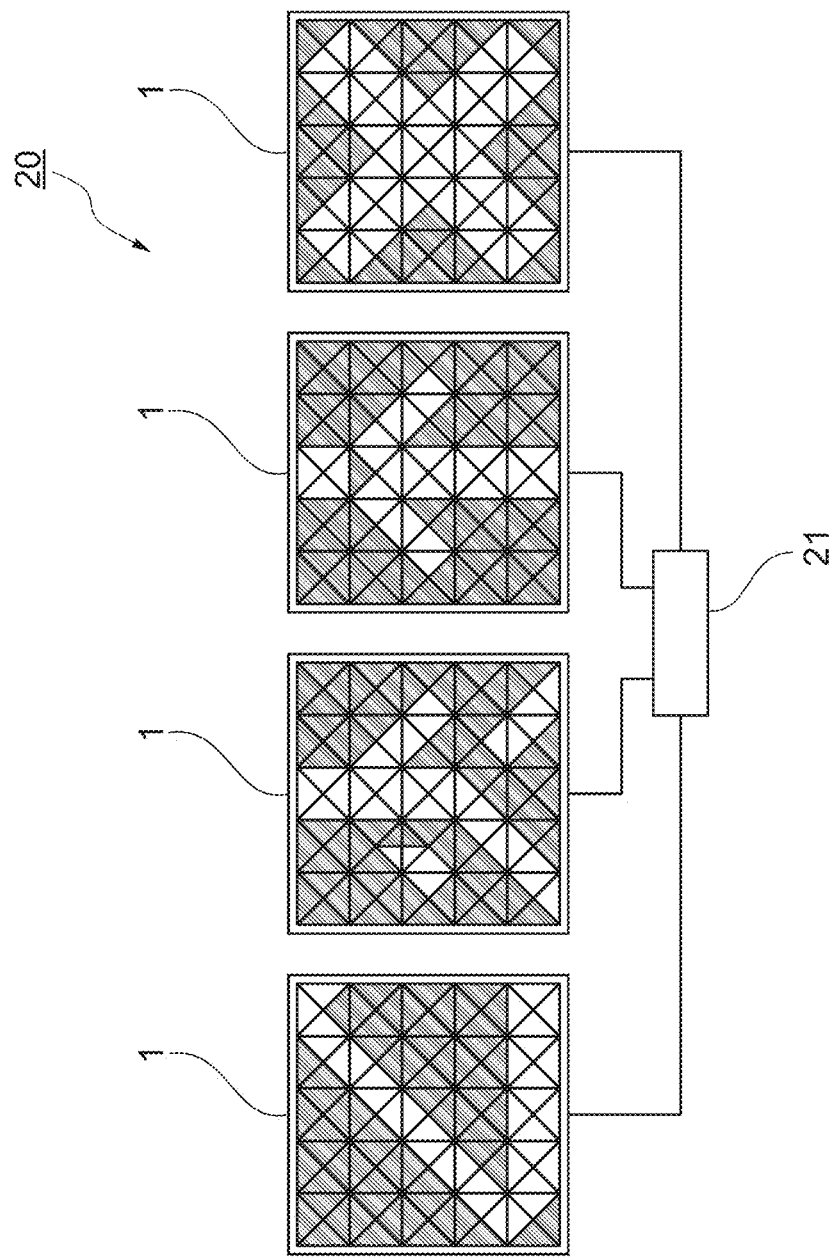
FIG. 14 shows a schematic view of an illumination system according to an example of the invention in operation with different light signatures.

FIG. 14 schematically shows an illumination system 20 with a plurality of, in the present case only four, illumination apparatuses 1. The illumination apparatuses 1 can be controlled by means of individual control units or as shown, by a common control unit 21.

FIG. 14 shows different light signatures, which are displayed by the respective illumination apparatuses 1. Individual contents or symbols are reproduced by means of the light signatures, such as a cross for a stop, a walking pedestrian or a standing pedestrian.

When using light emitting diodes 11 covering the color spectrum (yellow, red, blue), it is also possible to split the surface of an illumination apparatus 1, for example with a larger red area (red light emitting diodes) and a smaller yellow area (yellow light emitting diodes) or a different color division. As a result, two functions, e.g., tail light and direction indicator, or three functions, e.g., tail brake light and direction indicator, can also be realized.

Figure 15:
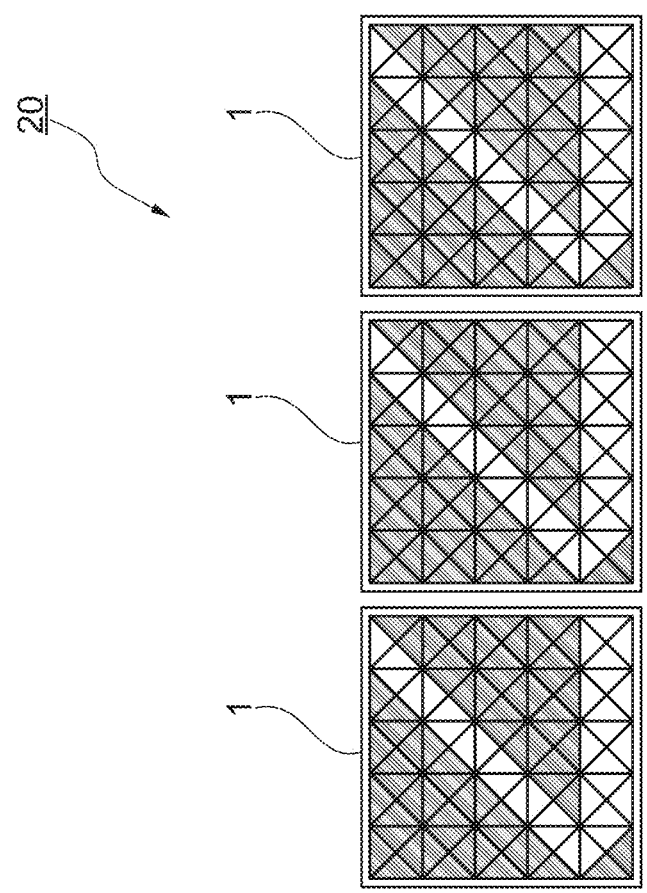
FIG. 15 shows a schematic view of an illumination system according to an example of the invention in operation with a common light signature.

However, it is also possible to match the light signatures of the individual illumination apparatuses 1. For example, FIG. 15 shows three illumination apparatuses 1 of an illumination system 20, each of which shows the same light signature.

Figure 16:
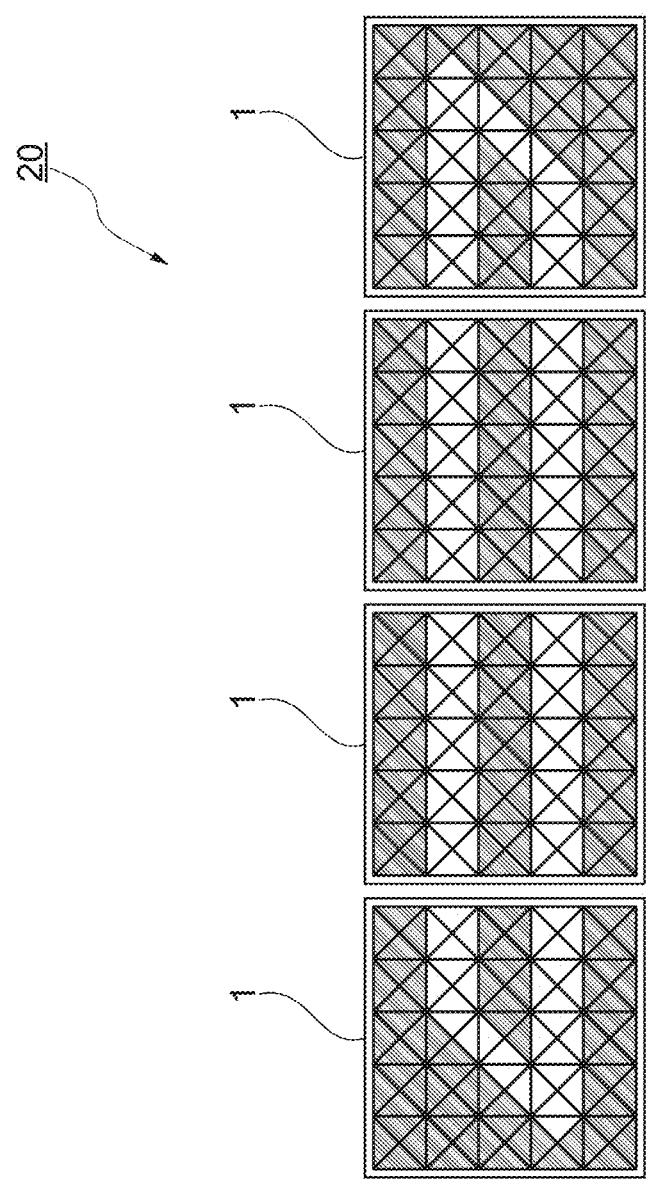
FIG. 16 shows a schematic view of the operating illumination system from FIG. 9 with a common light signature.
Figure 17:
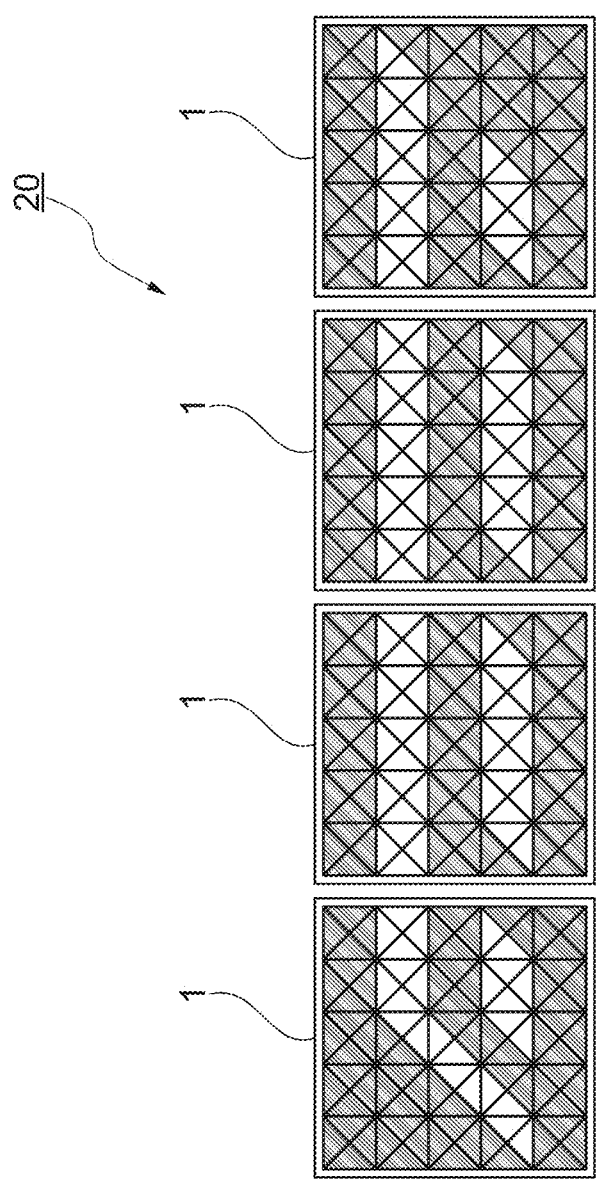
FIG. 17 shows a schematic view of the operating illumination system from FIG. 9 with another common light signature.

FIGS. 16 and 17 each show a different and self-contained or common light signature, which is produced by them together when four illumination apparatuses 1 are lined up or connected in series.

Figure 18:
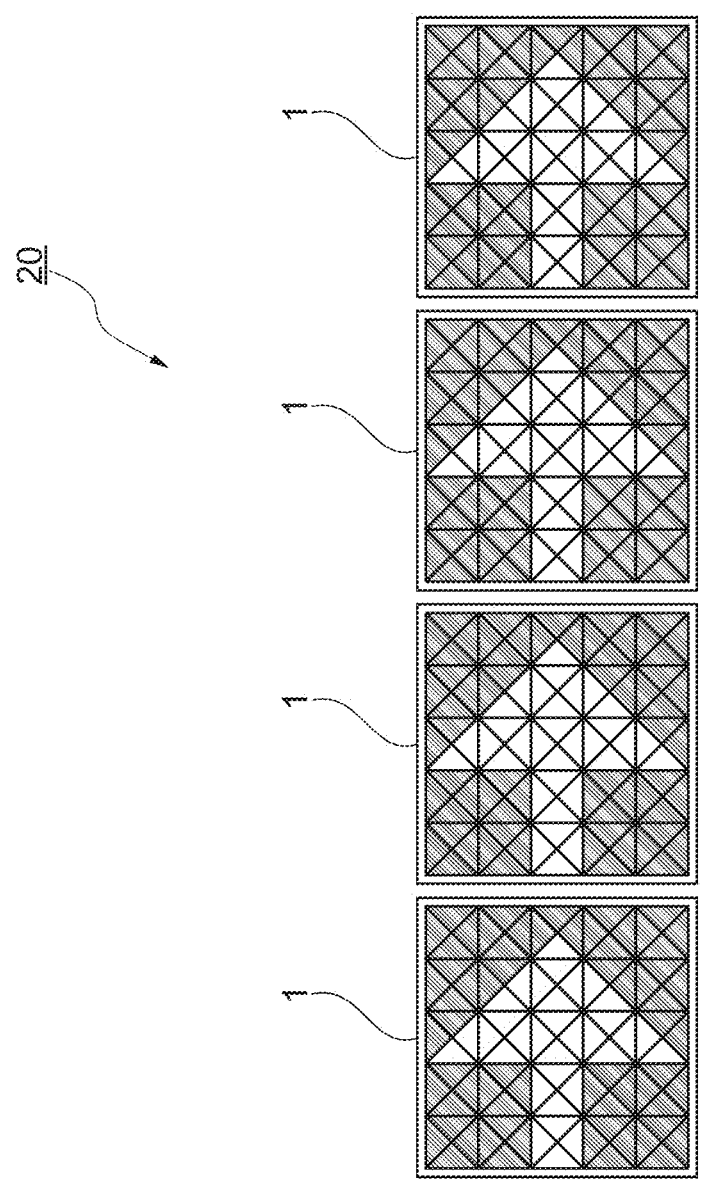
FIG. 18 shows a schematic view of the operating illumination system from FIG. 9 in with yet another common light signature.

FIG. 18, on the other hand, shows a repetition of a light signature on four illumination apparatuses 1 of an illumination system 20, in which the light signature has an indicator function that can be used, for example, when driving the motor vehicle 20 equipped with the illumination system 20, namely the display of a right-pointing arrow, which can also be referred to as a driving indicator and can be used, for example, to drive the motor vehicle 30 equipped with it (see FIG. 14) to the right.

Figure 19:
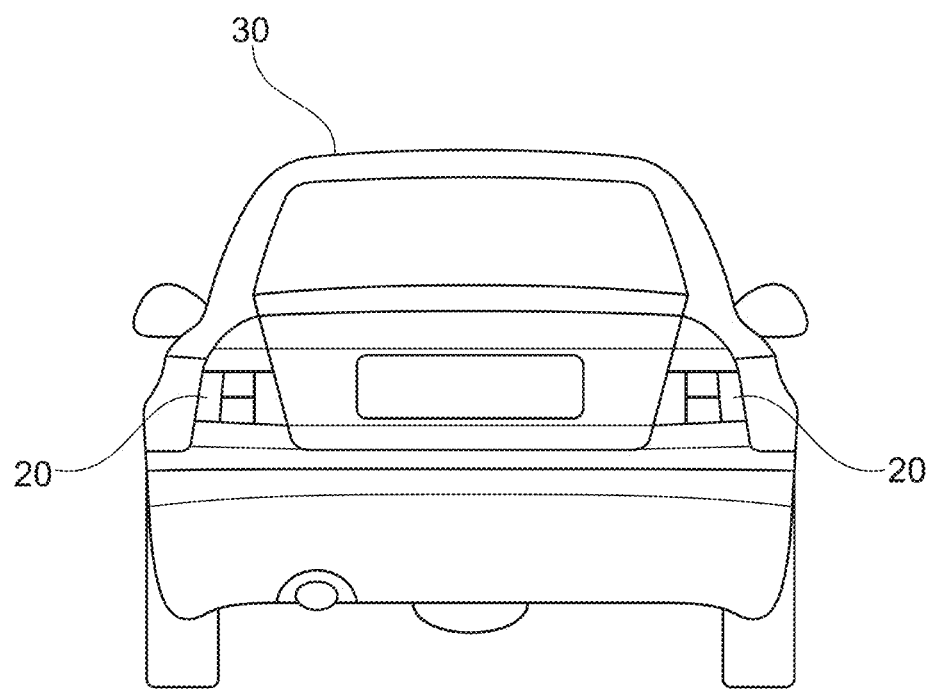
FIG. 19 shows a rear view of a motor vehicle according to an example of the invention.

FIG. 19 shows a motor vehicle 30 according to an example of the invention in a rear view. The motor vehicle 30 is designed with the illumination systems 20 described above, which in the present case are designed as rear lights of the motor vehicle 30 and thus enable the display of various common or different light signatures, for example a turn by means of corresponding arrow representations as light signatures.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. Illumination apparatus for a motor vehicle, the illumination apparatus comprising:
   a printed circuit board;
   a plurality of light emitting diodes arranged on the printed circuit board;
   an optical lens plate;
   a reflector element arranged between the printed circuit board and the optical lens plate, the reflector element comprising a plurality of segments into which the reflector element is divided, wherein each light emitting diode is associated with a respective one of the segments so that light emitted from the light emitting diodes is reflected at the segments of the reflector element and passes through the optical lens plate; and
   a screen arranged on the optical lens plate and is set up for selective switching of transparent and non-transparent areas,
   wherein the screen is a passive LC display, and
   wherein a back surface of the optical lens plate, that faces the reflector element, has concave lenses protruding therefrom in a direction towards the reflector element, the concave lenses being associated with the segments of the reflector element such that each respective concave lens extends into a respective one of the segments through an opening thereof.

2. The illumination apparatus according to claim 1, wherein the screen is designed to transmit light from active segments and to block light from non-active segments simultaneously, wherein the active segments are segments that are illuminated by the light emitting diodes associated with them and the non-active segments are segments that are not illuminated by the light emitting diodes associated with them, wherein the screen transmits light from the active segments by switching an area of the screen in front of the active segments to be transparent, and wherein the screen blocks light from the non-active segments by switching an area of the screen in front of the non-active segments to be non-transparent.

3. The illumination apparatus according to claim 1, wherein the the passive LC display is a dye-doped display with black color pigments.

4. The illumination apparatus according to claim 1, wherein each light emitting diode is associated with a respective one of the segments such that light emitted from each light emitting diode is reflected at the reflector element and passes through the optical lens plate in an area of the respective segment associated with each of the light emitting diodes.

5. The illumination apparatus according to claim 1, wherein the segments have a triangular shape, a rectangular shape, a pentagonal shape, a hexagonal shape or some other polygonal shape.

6. The illumination apparatus according to claim 1, wherein the plurality of segments are grouped together to form repeating row- and column-by-column arrangements at the reflector element.

7. The illumination apparatus according to claim 1, wherein each of the segments of the reflector element have strip optics.

8. The illumination apparatus according to claim 1, further comprising a housing, in which the printed circuit board, the reflector element, the optical lens plate and the screen are included.

9. The illumination apparatus according to claim 1, wherein a front surface or a back surface of the optical lens plate has optical scattering elements thereon.

10. An illumination system for a motor vehicle comprising the illumination apparatus according to claim 1 and a control unit to control a light signature display of the illumination apparatus.

11. The illumination system according to claim 10, wherein the illumination system has a plurality of illumination apparatuses and the control unit is set up to control at least two of the plurality of illumination apparatuses to display a common light signature.

12. A motor vehicle comprising an illumination apparatus according to claim 1.

13. The illumination apparatus according to claim 1, wherein each of the concave lenses has a concave central surface and side walls that extend from the concave central surface to the back surface of the optical lens plate.

* * * * *